(12) United States Patent
Traxler

(10) Patent No.: US 6,276,653 B1
(45) Date of Patent: Aug. 21, 2001

(54) SEAT SUSPENSION FOR A VEHICLE

(76) Inventor: Walter S. Traxler, Box 64, 405 South Pleasant, Kunkle, OH (US) 43531

(*) Notice: Subject to any disclaimer, the term of this patent is extended or adjusted under 35 U.S.C. 154(b) by 0 days.

(21) Appl. No.: 09/481,185

(22) Filed: Jan. 12, 2000

Related U.S. Application Data

(60) Provisional application No. 60/115,680, filed on Jan. 13, 1999.

(51) Int. Cl.$^7$ .................................................... F16M 1/00
(52) U.S. Cl. ......................... 248/562; 248/560; 114/363; 297/195.12
(58) Field of Search ............................ 180/190; 297/326, 297/195.12; 267/221; 114/363; 248/560, 565, 581, 576, 578, 596, 562

(56) References Cited

U.S. PATENT DOCUMENTS

| | | |
|---|---|---|
| 2,702,088 | 2/1955 | Klimek, Jr. . |
| 2,961,033 | 11/1960 | Galbraith . |
| 3,599,956 | 8/1971 | Harder, Jr. . |
| 3,674,104 | 7/1972 | Gostomski . |
| 3,736,020 | 5/1973 | Pilachowski et al. . |
| 4,469,010 | 9/1984 | Skover, Jr. et al. . |
| 4,662,597 | 5/1987 | Uecker et al. . |
| 4,779,695 | 10/1988 | Yasui . |
| 4,941,648 | 7/1990 | Kimura . |
| 4,946,145 | 8/1990 | Kurabe . |
| 5,309,861 | 5/1994 | Mardikian . |
| 5,353,734 | 10/1994 | Tani . |
| 5,358,305 | 10/1994 | Kaneko et al. . |
| 5,364,060 | 11/1994 | Donovan et al. . |
| 5,367,978 | 11/1994 | Mardikian . |
| 5,382,039 | 1/1995 | Hawker . |
| 5,423,280 | 6/1995 | Kelley . |
| 5,463,972 | 11/1995 | Gezari et al. . |
| 5,464,271 | 11/1995 | McFarland . |
| 5,489,139 | 2/1996 | McFarland . |
| 5,536,059 | 7/1996 | Amirouche . |
| 5,542,371 | 8/1996 | Harvey et al. . |
| 5,570,654 | 11/1996 | Rood . |
| 5,570,866 | 11/1996 | Stephens . |
| 5,601,338 | 2/1997 | Wahls . |
| 5,603,281 | 2/1997 | Harvey et al. . |
| 5,613,570 | 3/1997 | Becker . |
| 5,639,059 | 6/1997 | Nash . |
| 5,651,585 | 7/1997 | Van Duser . |
| 5,735,509 | 4/1998 | Gryp et al. . |

Primary Examiner—Ramon O. Ramirez
Assistant Examiner—Korie H. Chan
(74) Attorney, Agent, or Firm—Emch, Schaffer, Schaub & Porcello Co., L.P.A.

(57) ABSTRACT

The invention provides a seat suspension for a vehicle such as a snowmobile. The vehicle has a generally U-shaped structural tunnel having a top and opposed sides that are connected to the top extending along a portion of the vehicle. The tunnel has a first end and a second end. A seat support member is provided that has a first end and a second end. The first end of the seat support member is pivotally connected to the first end of the tunnel. The seat support member has a base and opposed side walls that extend from the base. The base is positioned in spaced apart relationship over at least a portion of the top of the tunnel. The opposed side walls of the seat support member extend in immediate spaced apart relationship over at least a portion of the sides of the tunnel. A flange is positioned to extend from each side of the seat support member. A yieldable support member is operatively connected to each flange and to the tunnel. The yieldable support member acts to control the movement of the seat support member in a direction towards and away from the top of the tunnel. A flexible flap is connected to the second end of the seat support member and the flap extends in immediate spaced apart relationship over the second end of the tunnel. The flexible flap in the side walls of the seat support member act to contain a volume of air between the base of the seat support member and the top of the tunnel whereby the volume of air acts to resist any sudden movement of such seat support member in a direction towards the top of the tunnel.

12 Claims, 2 Drawing Sheets

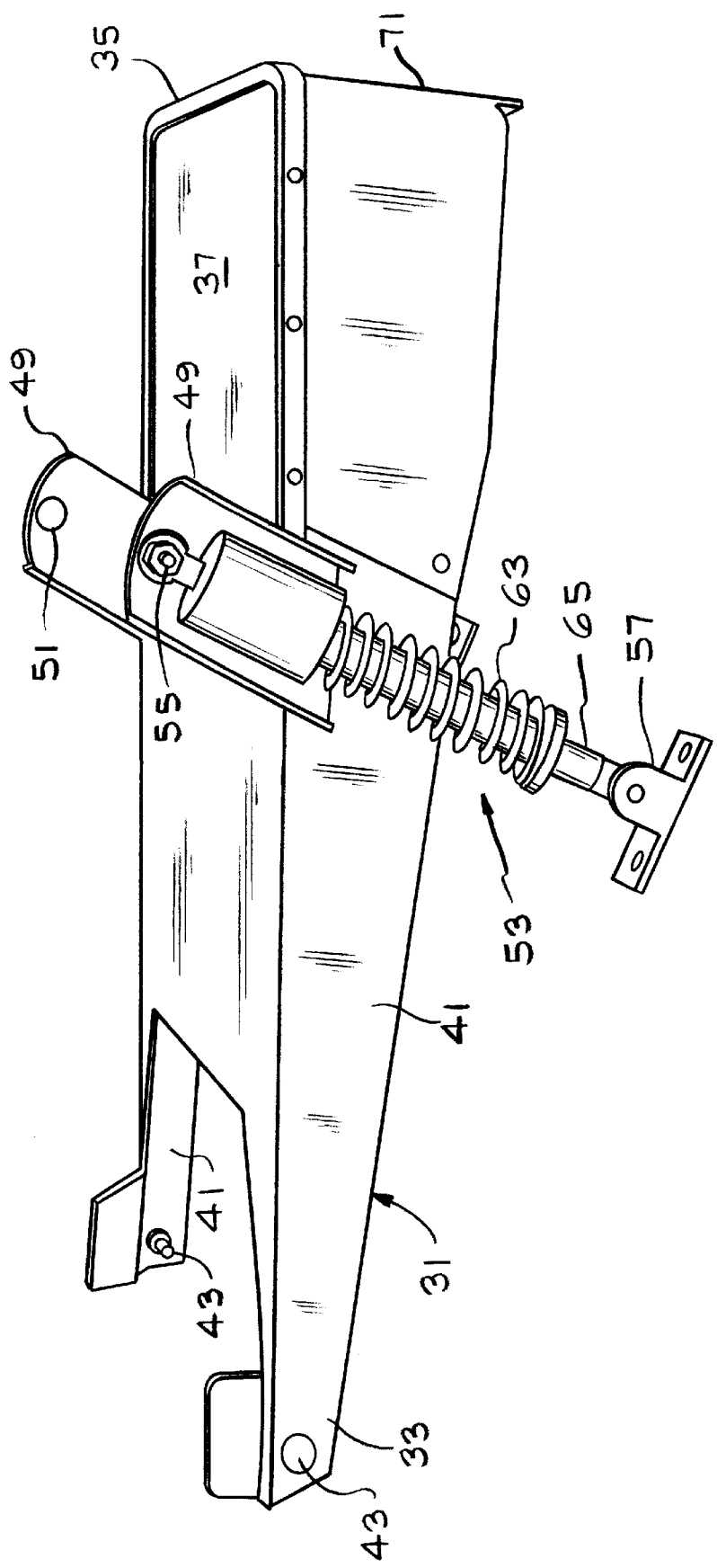

SEAT SUSPENSION FOR A VEHICLE

This application claims benefit of Provisional Application Ser. No. 60/115,680 filed Jan. 13, 1999.

FIELD OF THE INVENTION

The present invention relates generally to suspension systems for vehicles. More particularly, the invention relates to a seat suspension for a seat of the type usually straddled by the driver such as on a snowmobile or jet-driven watercraft.

BACKGROUND OF THE INVENTION

Snowmobiles and jet-driven watercraft usually have a seat that is straddled by the driver. The seat on such vehicles is usually secured directly to the chassis of the vehicle. On a snowmobile, there may be a suspension arrangement that connects to the drive track and the skis on the front of the snowmobile to absorb some of the shocks and bumps experienced by the snowmobile in use. However, the seat of the snowmobile is usually secured directly to the chassis or frame of the snowmobile and it is only the padding of the seat that prevents the effects of bumps and other shocks from being transferred from the snowmobile frame to the rider position on the seat. There have been some attempts to provide suspension devices between the frame of the snowmobile and the seat on the snowmobile as shown in U.S. Pat. No. 5,613,570. These prior art suspension systems for a snowmobile seat have proved less than satisfactory. A vehicle, such as a snowmobile, can encounter extremely irregular terrain and frequently the changes in the terrain are not clearly visible through the snow. This can result in a wide range of bumps and shocks that must be accommodated by the suspension system for the seat. The bumps can range from relatively minor to very severe such as when the snowmobile lands after being airborne. The prior art suspension systems for seats of the snowmobile have not adequately dealt with the wide range of conditions that are experienced by the snowmobile during use. If the spring means of the seat suspension are designed to accommodate the large bumps and shocks that are experienced by the snowmobile, the springs are so stiff that they do not provide any meaningful suspension when the snowmobile encounters smaller bumps or irregularities. Accordingly, the seat suspension is not functioning to provide any meaningful suspension activity over these smaller bumps or shocks. If the springs are sized to accommodate the smaller bumps or irregularities that the snowmobile encounters, the springs are not adequate to handle the large bumps or irregularities encountered during the operation of the snowmobile. With springs that are not adequate for the larger bumps, the seat will bottom out or strike the chassis of the snowmobile when the large bumps are encountered and this significantly negates any advantage provided by the seat suspension. In fact, if the seat bottoms out against the frame or chassis of the snowmobile, this may create a very unsettling condition for the operator of the snowmobile and makes the snowmobile more difficult to operate for the driver.

SUMMARY OF THE INVENTION

It is the principal object of the invention to provide an improved snowmobile seat suspension system. In accordance with the invention, there is a yieldable support member that operatively connects between the seat and the frame of the snowmobile which controls movement of the seat relative to the frame of the snowmobile. There is also provided an air cushion between the seat and the frame of the snowmobile that also acts to control the movement of the seat relative to the frame of the snowmobile. The yieldable support member and the air cushion are designed to allow the suspension system for the snowmobile seat to effectively accommodate small bumps or shocks experienced by the snowmobile while also providing an effective suspension for the seat when large bumps or shocks are encountered by the snowmobile.

Briefly, the invention provides a seat suspension for a vehicle such as a snowmobile. The vehicle has a generally U-shaped structural tunnel having a top and opposed sides that are connected to the top extending along a portion of the vehicle. The tunnel has a first end and a second end. A seat support member that has a first end and a second end is positioned over the tunnel. The first end of the seat support member is pivotally connected to the first end of the tunnel. The seat support member has a base and opposed side walls that extend from the base. The base is positioned in spaced apart relationship over at least a portion of the top of the tunnel. The opposed side walls of the seat support member extend in immediate spaced apart relationship over at least a portion of the sides of the tunnel. A flange is positioned to extend from each side of the seat support member. A yieldable support member is operatively connected to each flange and to the tunnel. The yieldable support member acts to control the movement of the seat support member in a direction towards and away from the top of the tunnel. A flexible flap is connected to the second end of the seat support member and the flap extends in immediate spaced apart relationship over the second end of the tunnel. The flexible flap in the side walls of the seat support member act to contain a volume of air between the base of the seat support member and the top of the tunnel whereby the volume of air acts to resist any sudden movement of such seat support member in a direction towards the top of the tunnel.

Further objects and advantages of the present invention will become apparent to those skilled in the art upon a review of the following detailed description of the preferred embodiments, the accompanying drawings and the claims.

BRIEF DESCRIPTION OF THE DRAWINGS

FIG. 2 is a perspective view showing the seat suspension of the present invention when it is not installed on a vehicle.

DETAILED DESCRIPTION OF THE PREFERRED EMBODIMENTS

Figure 1:
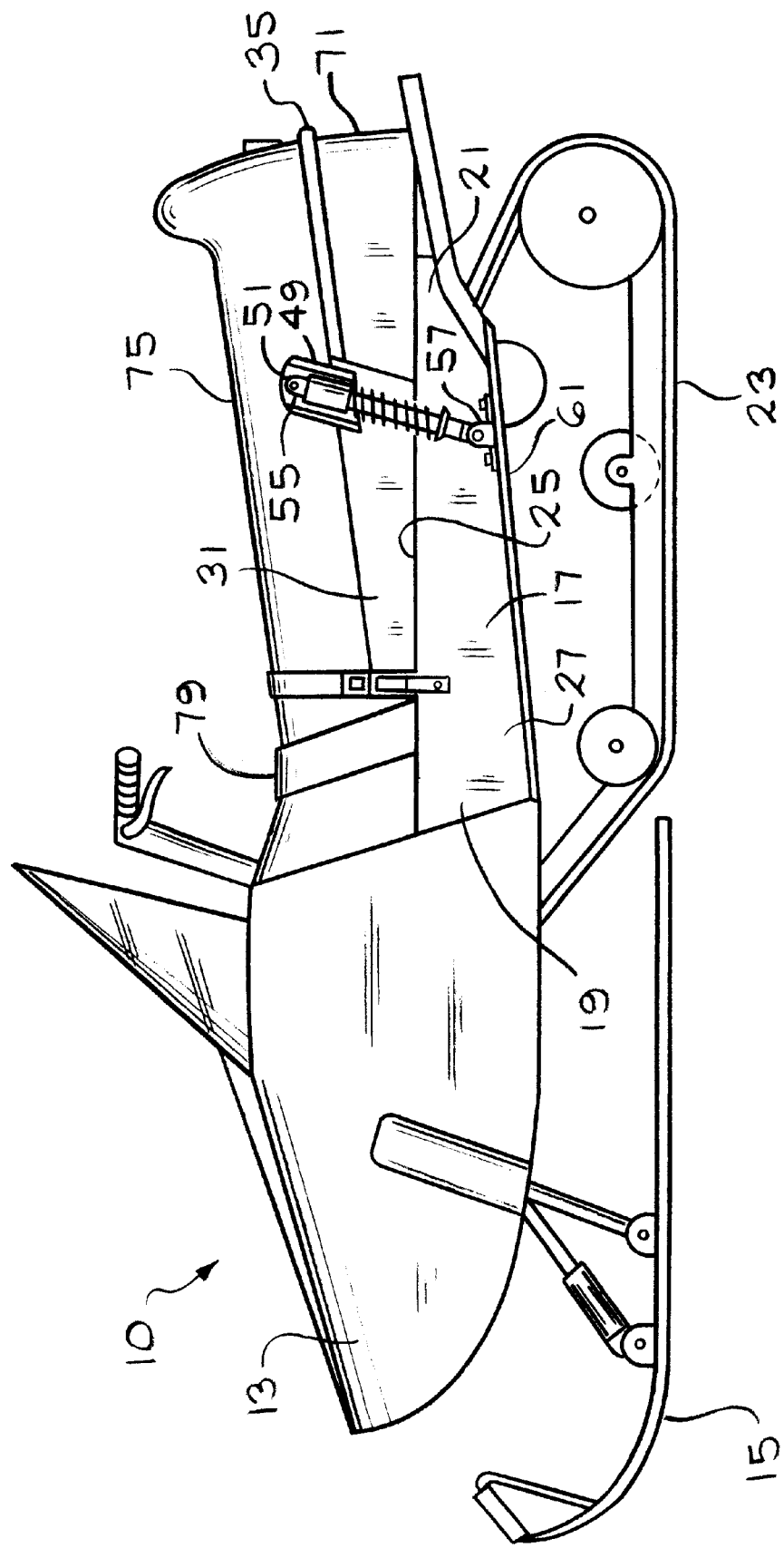
FIG. 1 is a side elevational view showing the invention installed on a snowmobile.

The present invention relates to a suspension system for use on a vehicle. More particularly, the invention relates to a suspension system that can be used for the seat of the type usually straddled by the driver such as on a snowmobile or jet-driven personal watercraft device. To simplify the explanation of the invention, it will be described as used on a snowmobile-type vehicle. However, it should be understood that other applications can be made for the suspension system of this invention. The features of the invention will be more readily understood by referring to the attached drawings in combination with the following description.

FIG. 1 shows a snowmobile 10 on which the seat suspension of the present invention is utilized. The snowmobile has a front portion 13 to which a pair of steerable skis 15 are operatively connected. A generally U-shaped structural tunnel 17 is connected to the front portion 13 of the snowmobile 10. A drive track 23 is operatively connected to the U-shaped tunnel 17 and the front portion 13 of the snowmobile. The basic construction and features of the snowmobile will not be described in detail as these components are well known in the art.

The U-shaped tunnel 17 has a top 25 and opposed sides 27 that are connected to the top. Each opposed side 27 extends from the top 25 in a direction toward the drive track 23. In most applications, the sides 27 are usually disposed to be substantially perpendicular to the top 25.

A seat support member 31 is positioned adjacent the U-shaped tunnel 17. The features of the seat support member 31 are shown in more detail in FIG. 2. The seat support member 31 has a first end 33 and a second 35. The first end 33 of the seat support member 31 is pivotally connected to the first end 19 of the U-shaped tunnel 17. The seat support member 31 has a base 37 and opposed side walls 41 that extend from the base. The side walls 41 extend from the base 37 in a direction toward the U-shaped tunnel 17. The side walls 41 are usually disposed to be substantially perpendicular to the base 37. The seat support member 31 can be pivotally connected to the U-shaped tunnel 17 by means of bolts or pins 43 that extend from the side walls 41 of the seat support member 31 and engage the opposed side 27 of the U-shaped tunnel 17. The seat support member 31 is pivotally connected to the U-shaped tunnel 17 in a manner whereby the base 37 is positioned in spaced apart relationship over at least a portion of the top 25 of the U-shaped tunnel 17. The opposed side walls 41 of the seat support member 31 are disposed to extend in immediate spaced apart relationship over at least a portion of the sides 27 of the U-shaped tunnel 17. The side walls 41 are designed to be in overlapping relationship with the sides 27 of the U-shaped tunnel 17 during the range of movement of the seat support member 31 relative to the U-shaped tunnel 17.

A mounting flange 49 is positioned on each side wall 41 of the seat support member 31. A yieldable support member 53 is operatively connected to each mounting flange 49 and to the U-shaped tunnel 17. The yieldable support member 53 can be connected to the mounting flange 49 by means of a bolt 55 that extends through an aperture 51 in the mounting flange 49. The yieldable support member 53 can be secured to the U-shaped tunnel 17 by means of a pillow block 57 that can be secured to the U-shaped tunnel. However, it should be understood that the yieldable support member 53 can be secured to the mounting flange 49 and U-shaped tunnel 17 by other well known means. It is also possible for the pillow block 17 to be secured to a foot support flange 61 that extends from the opposed sides 27 of the U-shaped tunnel 17. The foot support flange 61 extends from the end of the opposed sides 27 that is spaced apart from the top 25 of the U-shaped tunnel 17. The yieldable support member 53 normally comprises a spring member 63 such as a coil spring and a shock absorber 65. The yieldable support member 53 acts to control the movement of the seat support member 31 in a direction toward and away from the top 25 of the U-shaped tunnel 17.

The side walls 41 of the seat support member 31 usually terminate just beyond the point where the mounting flanges 49 are connected to the seat support member 31.

A flexible flap 71 is connected to the second end 35 of the seat support member 31. The flexible flap 71 extends in immediately spaced apart relationship over the second end 21 of the U-shaped tunnel 17. The flexible flap 71 is designed to be in overlapping relationship to the U-shaped tunnel 17 during the range of motion for the seat support member 31. The flexible flap 71 extends around the sides of the seat support member 31 at least for a distance whereby the flexible flap 71 is connected to the side walls 41 of the seat support member 31. The flexible flap 71 and the side walls 41 of the seat support member 31 act to contain a volume of air between the base 37 of the seat support member and the top 25 of U-shaped tunnel 17.

The seat 75 for the snowmobile 10 is positioned on the base 37 of the seat support member 31. The seat 75 is positioned on the side of the base 37 that is spaced apart from the top 25 of the U-shaped tunnel 17. A resilient seal member 79 can be positioned over the end of the seat 75 that is adjacent the front portion 13 of the snowmobile to resiliently seal the joint between the seat 75 and the front portion 13 of the snowmobile. The resilient seal member 79 acts to keep snow or other foreign objects from becoming positioned between the seat 75 and front portion 13 of the snowmobile. The resilient seal member 79 also aids in maintaining the volume of air between the base 37 of the seat support member 31 and the top 25 of the U-shaped tunnel 17.

In operation, the snowmobile 10 will traverse a wide range of terrain and the operator positioned on the seat 75 will be subject to various bumps and shocks as the snowmobile is utilized. When smaller bumps are encountered, the yieldable support members 53 secured to each side of the seat support member 31 by the mounting flanges 49 will provide the main suspension for the seat 75. As the bumps are encountered by the snowmobile 10, the yieldable support members 53 will allow the seat 75 to move in a direction away from and toward the U-shaped tunnel 17 to absorb the bumps and make the ride more pleasurable for the driver of the vehicle. As the seat support member 31 moves toward and away from the U-shaped tunnel 17, the volume of air contained between the base 37 of the seat support member 31 and the top 25 of the U-shaped tunnel 17 will be exhausted around the flexible flap 71 and the side walls 41 as the seat 75 is advanced toward the U-shaped tunnel 17. As the seat 75 moves away from the U-shaped tunnel 17, air will be drawn into the space between the base 37 of the seat support member 31 and the top 25 of the U-shaped tunnel 17 through the space provided between the flexible flap 71 and the side walls 41 and the opposed sides 27 of the U-shaped tunnel 17. As long as the bumps are relatively minor in nature and the base 37 of the seat support member 31 does not move to quickly with respect to the top 25 of the U-shaped tunnel 17, the volume of air between the base 37 and the top 25 will change in a gradual manner and the air will provide only a slight amount of assistance in controlling the movement of the base 37 of the seat support member 31 with respect top 25 of the U-shaped tunnel 17. However, when large bumps are encountered, there will be a much greater force acting on the seat 75 to move the seat in a direction toward the U-shaped tunnel 17. When this occurs, it will not be possible to exhaust a sufficient volume of air from the space between seat support member 31 and the U-shaped tunnel 17. The volume of air will slow the movement of the seat 75 in a direction toward the U-shaped tunnel 17 and provide additional suspension support for the seat 75 when large bumps or shocks are encountered by the vehicle. In this manner the seat suspension of the present invention utilized to effectively accommodate small bumps or forces while still being adequate to accommodate large bumps or forces that are encountered during the operation of the vehicle.

The overlapping relationship between the sides 27 of the U-shaped tunnel 17 and the side walls 41 and flexible flap 71 of the seat support member 31 acts to prevent snow or other objects from entering the space between the base 37 of the seat support member 31 and the top 25 of the U-shaped tunnel 17.

The above detailed description of the present invention is given for the sake of generally describing the invention. It will be apparent to those skilled in the art that numerous changes, modifications and substitutions can be made without departing from the scope of the invention as defined by the following claims.

I claim:

1. A seat suspension for a vehicle comprising:

a generally U-shaped structural tunnel having a top and opposed sides connected to said top and extending along a portion of said vehicle, said tunnel having a first end and a second end;

a seat support member having a first end and a second end, said first end of said seat support member being pivotally connected to said first end of said tunnel, said seat support member having a base and opposed sidewalls that extend from said base, said base being positioned in spaced apart relationship over at least a portion of said top of said tunnel, said opposed sidewalls extending in immediate spaced apart relationship over at least a portion of said sides of said tunnel;

a flange extending from each side of said seat support member;

at least one yieldable support member operatively connected to said flange and to said tunnel, said yieldable support member acting to control the movement of said seat support member in a direction toward and away from said top of said tunnel; and, a flexible flap connected to said second end of said seat support member, said flexible flap extending in immediate spaced apart relationship over said second end of said tunnel, said flexible flap and said sidewalls of said seat support member acting to contain a volume of air between said base of said seat support member and said top of said tunnel whereby said volume of air acts to resist any sudden movement of said seat support member in a direction toward said top of said tunnel.

2. The seat suspension of claim 1 wherein said flanges on said seat support member extend in a direction away from said base and said top of said tunnel.

3. The seat suspension of claim 1 wherein said yieldable support member includes a spring and a shock absorber.

4. The seat suspension of claim 1 wherein a seat for said vehicle is positioned on said base and is spaced apart from said top of said tunnel.

5. The seat suspension of claim 1 wherein said sidewalls of said seat support member extend from said first end of said seat support member to said flanges that are positioned on each side of said seat support member.

6. The seat suspension of claim 5 wherein said flexible flap extends from said flanges an wraps around said second end of said seat support member.

7. The seat suspension of claim 3, wherein at least one yieldable support member is operatively connected to said flange on each side of said seat support member.

8. The seat suspension of claim 4, wherein a resilient seal member is positioned over an end of said seat that is adjacent a front portion of said vehicle.

9. The seat suspension of claim 1, wherein said yieldable support member is secured to said seat support member by at least one of said mounting flanges.

10. The seat suspension of claim 1, wherein said yieldable support member is secured to a foot support flange that extends from the structural tunnel.

11. The seat suspension of claim 1, wherein said vehicle is a snowmobile.

12. The seat suspension of claim 1, wherein said vehicle is a personal watercraft device.

* * * * *